United States Patent
Tanemura et al.

(10) Patent No.: US 9,409,334 B2
(45) Date of Patent: Aug. 9, 2016

(54) INJECTION MOLDING MACHINE WITH PURGE SHIELD

(71) Applicant: NISSEI PLASTIC INDUSTRIAL CO., LTD., Hanishina-gun, Nagano (JP)

(72) Inventors: Daiki Tanemura, Nagano (JP); Hiroyuki Handa, Nagano (JP)

(73) Assignee: NISSEI PLASTIC INDUSTRIAL CO., LTD. (JP)

(*) Notice: Subject to any disclaimer, the term of this patent is extended or adjusted under 35 U.S.C. 154(b) by 0 days.

(21) Appl. No.: 14/740,361

(22) Filed: Jun. 16, 2015

(65) Prior Publication Data
US 2016/0016344 A1  Jan. 21, 2016

(30) Foreign Application Priority Data
Jul. 16, 2014  (JP) .................. 2014-146232

(51) Int. Cl.
  *B29C 45/17*  (2006.01)
(52) U.S. Cl.
  CPC .................. *B29C 45/1755* (2013.01)
(58) Field of Classification Search
  CPC .................................. B29C 45/1755
  See application file for complete search history.

(56) References Cited

U.S. PATENT DOCUMENTS 5,460,505 A * 10/1995 Ito ...................... B29C 45/17
                                                425/151

FOREIGN PATENT DOCUMENTS

| JP | 02060723 A | * | 3/1990 |
| JP | 02063710 A | * | 3/1990 |
| JP | 05245875 A | * | 9/1993 |
| JP | 06182816 A | * | 7/1994 |
| JP | 2691661    |   | 9/1997 |

\* cited by examiner

*Primary Examiner* — Ryan Ochylski
(74) *Attorney, Agent, or Firm* — Adams & Wilks

(57) ABSTRACT

A purge shield provided on an injection molding machine includes a front plate attached to a fixed platen, a top plate extending horizontally from an upper edge of the front plate, and left and right side plates extending vertically downward from left and right side edges, respectively, of the top plate. The top plate includes a fixed plate section and a movable plate section pivotally connected by first hinges to the fixed plate section. The left side plate is pivotally connected by second hinges to the movable plate section and constitutes a lifting plate. A lower end of the lifting plate is connected by a pin to a vertical guide groove formed in the front plate.

7 Claims, 5 Drawing Sheets

INJECTION MOLDING MACHINE WITH PURGE SHIELD

FIELD OF THE INVENTION

The present invention relates generally to an injection molding machine, and more particularly to such an injection molding machine having a purge shield attached to a fixed platen for preventing a resin from scattering as it is purged from a nozzle.

BACKGROUND OF THE INVENTION

When the resin currently used on an injection molding machine is to be changed to a new resin of a different kind or color, a resin part remaining within nozzle of the injection molding machine is discharged in preparation for the charging with the new resin. Such resin-discharging operation is called "purging". Since the purging is performed while the nozzle is separated from a mold sprue, the resin while being still hot is allowed to scatter as it is purged from the nozzle. The scattering resin may burn or injure a human operator. The scatting resin may further damage a cylinder which is disposed near the nozzle for reciprocating an injection device or unit including the nozzle.

To deal with this problem, various purge shields have been proposed theretofore. One example of such purge shields is disclosed in Japanese Patent Application Laid-open Publication (JP-A) No. H05-309694. The disclosed purge shield is attached to a front plate (corresponding to a fixed platen) of an injection molding machine so as to prevent a resin from scattering as it is purged from a nozzle. The purge shield includes an inverted U-shaped attachment plate removably attached to a pair of laterally spaced L-shaped hooks fixedly provided on a front surface of the front plate, a horizontal top plate extending from an upper edge of the attachment plate in a direction away from the front plate, and vertical left and right side plates hinged to left and right edges, respectively, of the attachment plate for undergoing pivotal movement in a horizontal plane.

The purge shield of the foregoing construction is hooked on the L-shaped hooks and, hence, is readily removable from the front plate as a whole. In a state that the purge shield is attached to the front plate, the purge shield can be opened by simply turning the left side plate or the right side plate about its associated hinges through an angle of 90 degrees. A human operator is therefore allowed to perform visual confirmation of a state of engagement between the nozzle and a mold sprue.

The injection molding machine shown in JP H05-309694A is provided with a single cylinder disposed below the nozzle and extending along a longitudinal centerline of a base for reciprocating an injection unit. The single cylinder is likely to undergo slight lateral deflection as it is operating to reciprocate the injection unit. Since the lateral deflection directly affects the state of engagement between the nozzle and the mold sprue, an appropriate countermeasure is needed.

As one possible countermeasure, it may be considered that the single cylinder is replaced by two cylinders arranged such that a first cylinder is disposed on a lateral outer side of the left side plate of the purge shield, and a second cylinder is disposed on a lateral outer side of the right side plate of the purge shield. This arrangement, however, makes it impossible to place the purge shield in a fully-opened position due to interference between the side plates and the adjacent cylinders. To avoid this problem, the side plates should have a vertical length reduced so as to clear the cylinders. However, the side plates having a reduced vertical length can only achieve a limited purged-resin-scattering preventive function.

The demand for precision injection molding has increased in recent years. In view of this, it is desirable that a purge shield has side plates which can be easily opened and closed even when the purge shield is used with an injection molding machine having two cylinders for reciprocating an injection unit.

It is accordingly an object of the present invention to provide an injection molding machine equipped with a purge shield having a side plate that can be opened and closed with utmost ease.

SUMMARY OF THE INVENTION

According to the present invention, there is provided an injection molding machine comprising: a fixed platen to which a mold is fixedly mounted; an injection unit having a nozzle from which a molten resin is injected into the mold; and a purge shield mounted to the fixed platen for preventing the molten resin from scattering as the molten resin is purged from the nozzle. The purge shield includes a front plate attached to the fixed platen, a top plate extending horizontally from an upper edge of the front plate toward the injection unit, and left and right side plates extending vertically downward from left and right side edges, respectively, of the top plate. The top plate includes a fixed plate section fixedly connected to the front plate and a movable plate section pivotally connected by a first hinge to the fixed plate section for undergoing pivotal movement in a vertical direction about the first hinge. One of the left side plate and the right side plate is pivotally connected by a second hinge to the movable plate section for undergoing pivotal movement in the vertical direction about the second hinge, the one side plate constituting a lifting plate. The front plate has a vertical guide groove formed therein and a pin slidably fitted in the guide groove, the pin being connected to a lower end portion of the lifting plate. The first hinge possesses a frictional resistance force set to allow the lifting plate to remain stationary at an arbitrary height.

With this arrangement, because the lifting plate is movable in the vertical direction, the purge shield can be opened and closed even when another structural component, such as an injection-unit-reciprocating cylinder, of the injection molding machine is disposed in a lateral outer side of the lifting plate. Furthermore, by the effect of the frictional resistance force produced by the first hinge, the lifting plate is allowed to remain stationary at an arbitrary height without requiring muscular effort by a human operator. The lifting plate of the purge shield can be opened and closed reliably with utmost ease.

Preferably, the movable plate section has a maximum opened angle more than 90°. When the movable plate section is in its fully opened position where the opened angle of the movable plate section is more than 90°, a rotational force or torque applied to the first hinge is substantially zero or very small. This arrangement ensures that the lifting plate can never start moving downward by the effect of its own weight even when the frictional resistance force produced by the first hinge becomes small due to deterioration over time. The first hinge can eventually have a prolonged service life.

It is preferable that the movable plate section has a size or a hinged position relative to the fixed plate section determined such that the movable plate section does not protrude beyond an upper end of the fixed platen when the movable plate section pivots upwardly to assume an opened position having an opened angle of 90°. This arrangement allows another structural member, such as a product takeout mechanism, to be installed on an upper surface of the fixed platen.

Preferably, the lifting plate has a transparent inspection window. With this arrangement, since the human operator is allowed to perform visual inspection of the nozzle through the transparent inspection window while the lifting plate is disposed in a lowermost fully-closed position, frequency of use of the first hinge can be reduced. The service life of the first hinge can thus be extended further.

In one preferred form of the invention, the injection unit is connected by left and right cylinders to the fixed platen for undergoing reciprocating movement toward and away from the fixed platen by operation of the cylinders. By virtue of the two cylinders, the injection unit is able to undergo linear reciprocating movement toward and away from the fixed platen without causing lateral deflection, so that the nozzle and a mold sprue are aligned correctly with increased accuracy.

Preferably, one of the left and right cylinders located closer to the lifting plate than to the other of the left side plate and the right side plate is provided in a position lower than a position of the nozzle, and the other of the left and right cylinders is provided at a position higher than the position of the nozzle. Since the one cylinder is located at the position below the position of the nozzle, a nozzle inspection work, which is performed by the human operator while the lifting plate is disposed in the opened position, can be achieved smoothly and reliably without obstruction by the one cylinder.

It is preferable that the one cylinder and the other cylinder are positioned in point symmetry with respect to an axis of the nozzle. With this arrangement, since the midpoint on a straight line connecting respective axes of the one and other cylinders is coincident with the axis of the nozzle, the nozzle and the mold sprue can be aligned correctly with enhanced accuracy.

DETAILED DESCRIPTION OF THE PREFERRED EMBODIMENT

A certain preferred structural embodiment of the present invention will be described in greater details below, by way of example only, with reference to the accompanying sheets of drawings.

Figure 1:
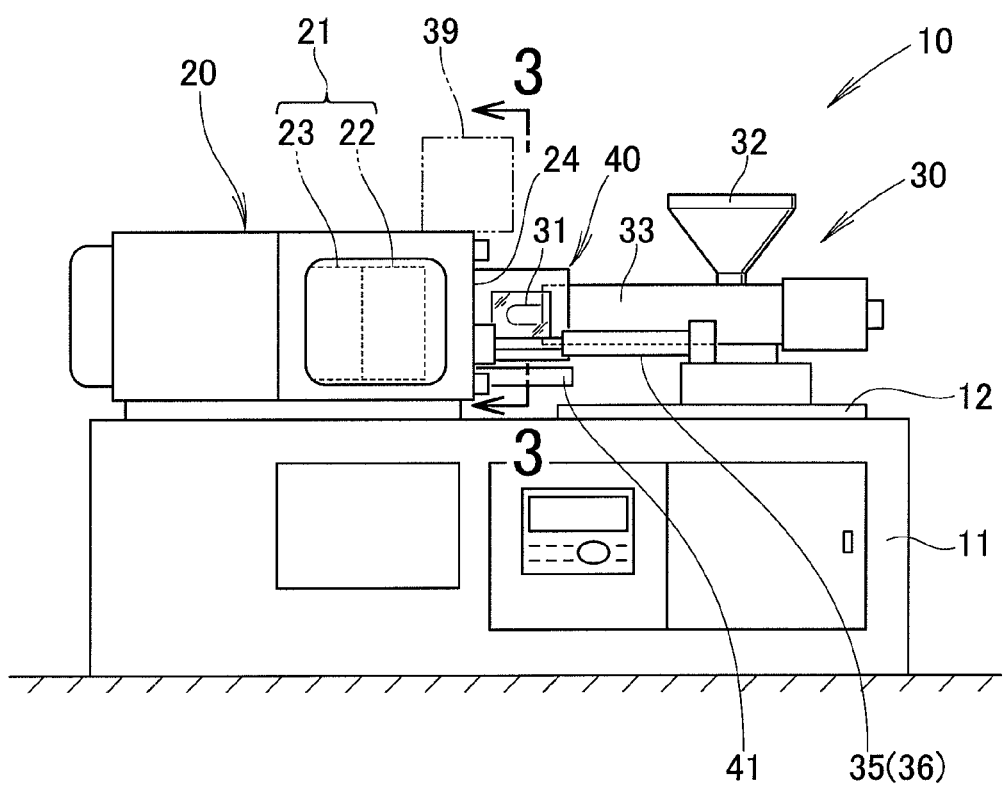
FIG. 1 is a front elevational view of an injection molding machine equipped with a purge shield according to an embodiment of the present invention.

As shown in FIG. 1, an injection molding machine 10 includes a bed 11, a clamp mechanism 20 mounted on the bed 11, and an injection unit 30 mounted on the bed 11. The clamp mechanism 20 is a mechanism for clamping a mold 21. The mold 21 is composed of a fixed mold 22 and a movable mold 23 movable toward and away from the fixed mold 22. The fixed mold 22 is fixedly mounted to a fixed platen 24. The injection unit 30 includes a heating cylinder 33 having a nozzle 31 provided at a front end thereof for injecting a molten resin, and a hopper 32 provided at an upper part of the heating cylinder 33 for being charged with a resin material.

The bed 11 has a pair of parallel spaced rails 12 provided on a top surface thereof, and the injection unit 30 is slidably mounted on the rails 12. Two parallel spaced injection-unit-reciprocating cylinders 35, 36 (FIG. 3) are provided to extend between and connect the injection unit 30 and the fixed platen 24. One injection-unit-reciprocating cylinder (left cylinder) 35 is disposed on a left side of the heating cylinder 33 and the other injection-unit-reciprocating cylinder (left cylinder) 36 is disposed on a right side of the heating cylinder 33. The thus provided injection-unit-reciprocating cylinders 35, 36 operate in synchronism with each other to reciprocate the injection unit 30 along the rails 12 between an advanced position in which the nozzle 31 is in contact with a mold sprue (not shown) formed in the mold 21, and a retracted position in which the nozzle 31 is separated from the mold sprue. A product takeout mechanism 39 is provided on a top surface of the fixed platen 24 for taking out a molded product from the mold 21.

When the resin currently used on the injection molding machine 10 is to be changed to a new resin of a different type or color, the resin currently remaining within the nozzle 31 is forcibly discharged from the nozzle 31. Such purging operation is performed while the nozzle 31 is separated from the fixed platen 24. This arrangement allows the resin to scatter as it is purged from the nozzle 31. According to the present invention, a purge shield 40 is provided on the fixed platen 24 in such a manner as to enclose the nozzle 31 to thereby prevent the resin from scattering as it is purged from the nozzle 31. The purged resin is received in a tray 41 disposed below the nozzle 31.

Figure 2:
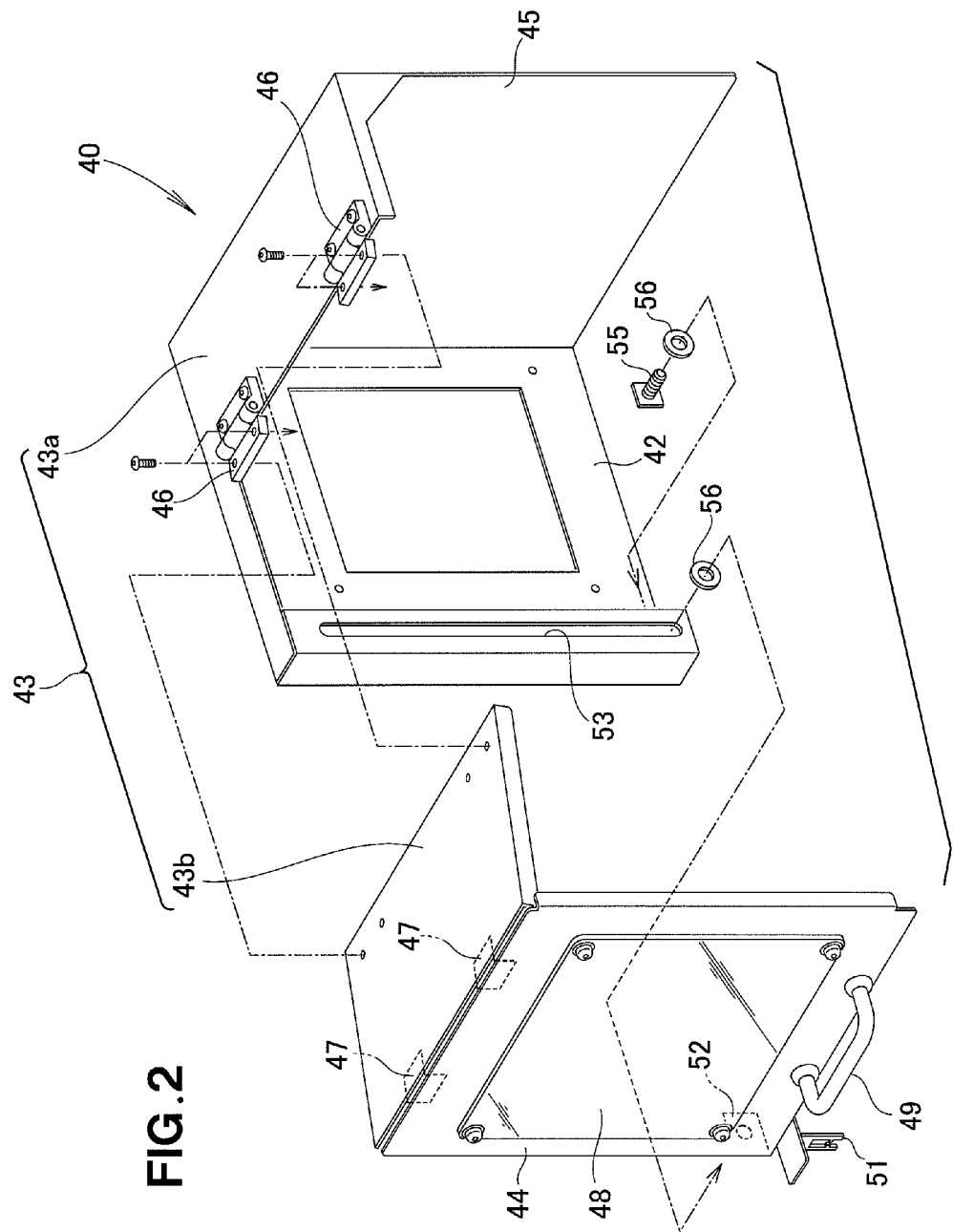
FIG. 2 is an exploded perspective view of the purge shield.

Structural details of the purge shield 40 will be described below with reference to FIG. 2. As shown in FIG. 2, the purge shield 40 includes a front plate 42 disposed vertically, a top plate 43 extending horizontally from an upper edge of the front plate 42, and left and right side plates 44 and 45 extending vertically downward from left and right side edges, respectively, of the top plate 43. The top plate 43 is composed of a fixed plate section 43a fixedly connected to the front plate 42, and a movable plate section 43b pivotally connected by a pair of first hinges 46 to the fixed plate section 43a for undergoing pivotal movement in a vertical direction about the first hinges 46.

One of the side plates 44, 45 (the left side plate 44 in the illustrated embodiment, but the right side plate 45 may be adopted) is pivotally connected by a pair of second hinges 47 to the movable plate section 43b for undergoing pivotal movement in the vertical direction about the second hinges 47. The side plate 44 constituting a lifting plate. The second hinges 47 are ordinary hinges that can be folded with little resistance.

The lifting plate 44 has a large inspection window 48 formed of a transparent resin sheet. The lifting plate 44 is provided with a handle 49 at a lower end portion thereof for operation by a human operator. A detection plate 51 is provided on a lower end of the lifting plate 44 and extends vertically downward. An attachment lug 52 formed as an integral part of the lifting plate 44 is located at a lower corner adjacent to the front plate 42 and bent at right angles to a plane of the lifting plate 44 so as to project in a direction toward the right side plate 45. The front plate 42 has a vertical guide groove 53 formed therein to extend alongside a left edge thereof. A headed pin 55 is slidably fitted in the guide groove 53. The pin 55 has a distal end portion connected to the attachment lug 52 on the lifting plate 44. In the illustrated embodiment, the distal end portion of the pin 55 is engaged in a hole (not designated) formed in the attachment lug 52. The pin 55 has a diameter smaller than a width of the guide groove 53. Two washers 56 are fitted over the pin 55 such that one washer 56 is disposed between an enlarged head of the pin 55 and the front plate 42, and the other wisher 56 is disposed between the front plate 42 and the attachment lug 52. With this arrangement, the pin 55 can be moved along the guide groove 53 in response to vertical movement of the lifting plate 44.

Each of the first hinges 46 has a built-in member (not shown), such as a spring plate, provided to produce a frictional resistance force such that a resistance against folding (anti-folding resistance) of the first hinges 46 can be arbitrarily set. According to the present invention, the anti-folding resistance of the first hinges 46 is set to be greater than a couple moment produced by an own weight of the lifting plate 44 and an own weight of the movable plate section 43b.

Figure 3:
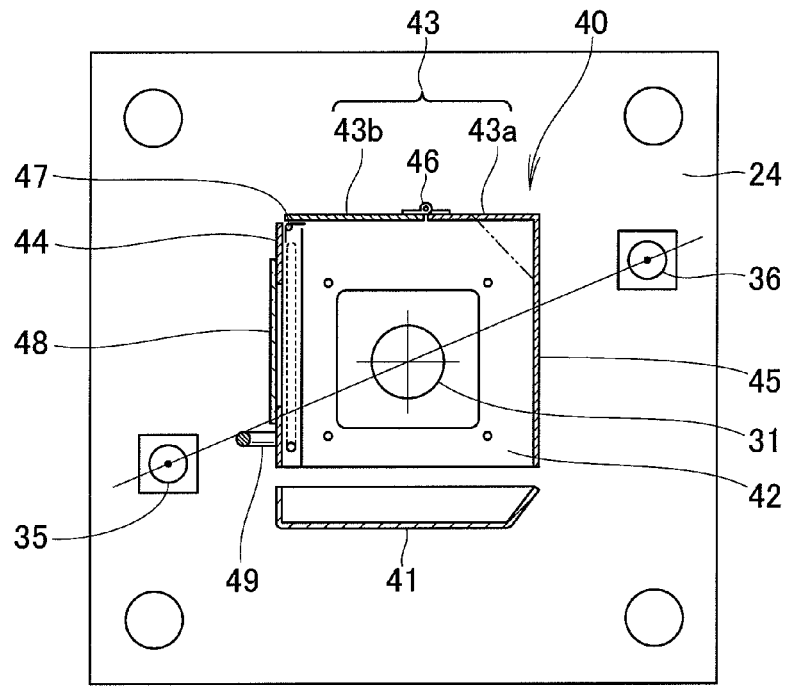
FIG. 3 is a cross-sectional view taken along line 3-3 of FIG. 1.

The purge shield 40 of the foregoing construction is attached to the fixed platen 24, as shown in FIG. 3. As shown in FIG. 3, the nozzle 31 is enclosed on its three sides by the top plate 43, and the left and right side plates 44 and 45 so that the resin as it is purged from the nozzle 31 is prevented from scattering outside the purge shield 40. The inspection window 48 provided on the lifting plate (left side plate) 44 allows the human operator to perform visual inspection of the nozzle 31 at any time when needed.

In the illustrated embodiment, the left injection-unit-reciprocating cylinder 35 is disposed on a left side of the purge shield 40, and the right injection-unit-reciprocating cylinder 36 is disposed on a right side of the purge shield 40. The human operator can lift up the lifting plate 44 while gripping the handle 49.

Figure 4:
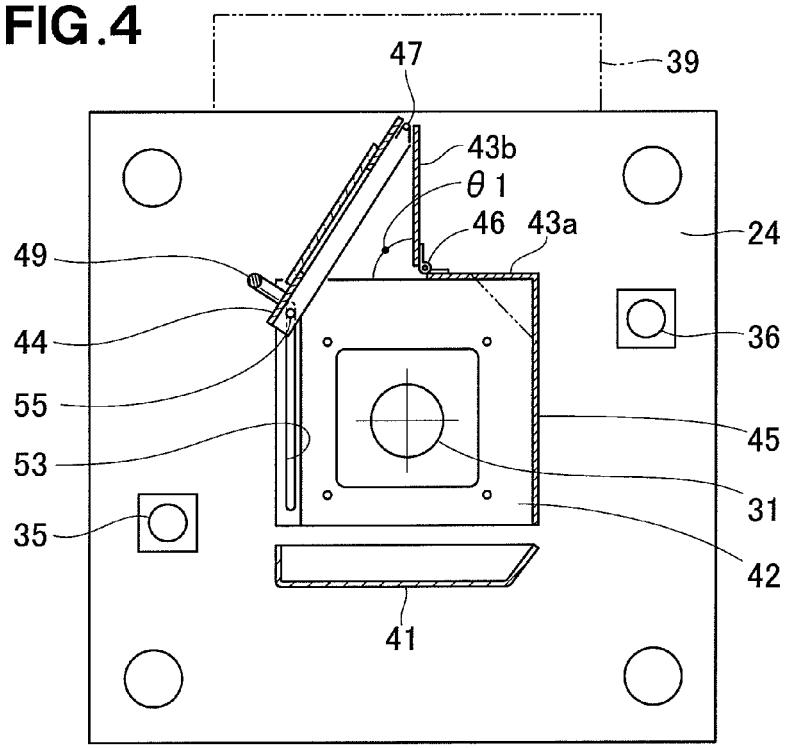
FIG. 4 is a view similar to FIG. 3, but showing the purge shield as it is in an open position.

During that time, by virtue of a connection by the second hinges 47, the lifting plate 44 and the movable plate section 43b are folded into an inverted V shape, as shown in FIG. 4. In the position shown in FIG. 4, an opened angle θ of the movable plate section 43b relative to a horizontal plane is equal to 90°. The movable plate section 43b, as it is in this opened position (θ=90°), does not protrude beyond an upper side of the fixed platen 24. The movable plate section 43b is therefore kept free from interference with the product takeout mechanism 39 indicated by phantom lines shown in FIG. 4.

Figure 5:
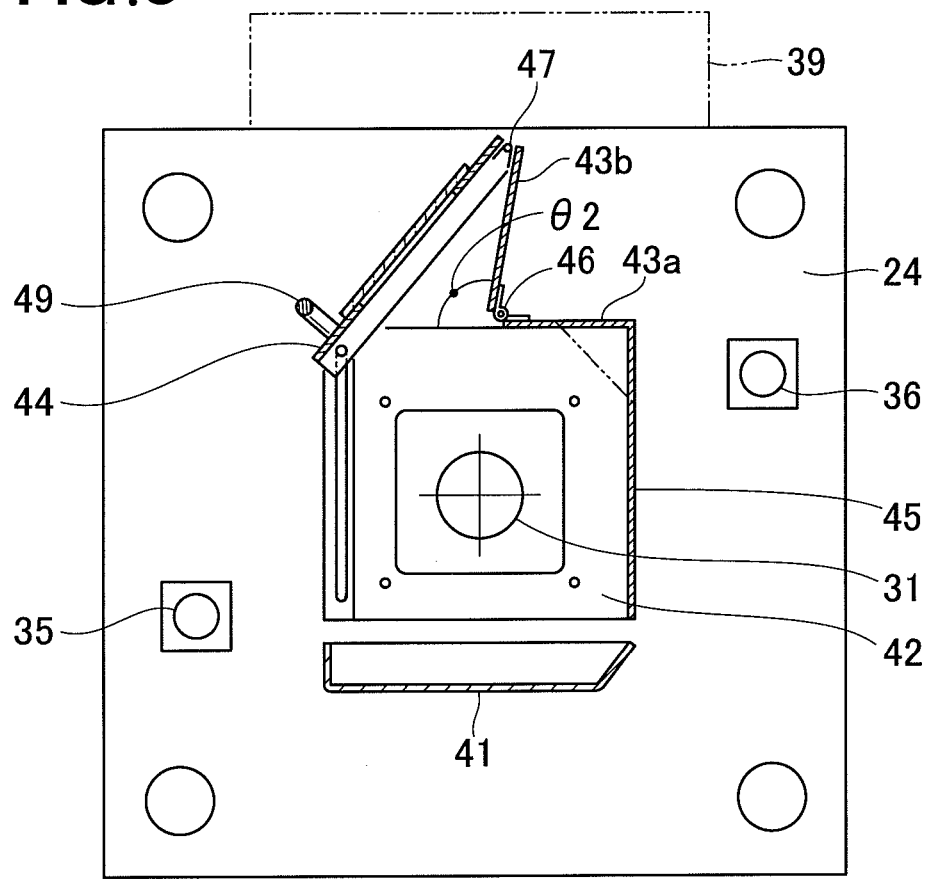
FIG. 5 is a view similar to FIG. 4, but showing the purge shield as it is in a fully-opened position.

As shown in FIG. 5, the movable plate section 43b can be opened until it assumes a fully opened position in which the movable plate section 43b has a maximum opened angle greater than 90°, for example 100°. In this condition, the own weight of the movable plate section 43b produces a couple moment in the clockwise direction about the first hinges 46. At the same time, the own weight of the lifting plate 44 produces a couple moment in the counterclockwise direction about the first hinges 46. Since the couple moment produced by the movable plate section 43b and the couple moment produced by the lifting plate 44 are cancelled each other, a couple moment acting on the first hinges 46 in a direction to close or lower the lifting member 44 is small. The lifting plate 44 can never start moving downward from the position of FIG. 5 by the effect of its own weight even when the frictional resistance force produced by the first hinges 46 becomes small due to deterioration of the first hinges 46.

Furthermore, since the left injection-unit-reciprocating cylinder 35 located on the left side of the lifting plate 44 is provided at a position lower than a position of the nozzle 31, a nozzle inspection work, which is performed while the lifting plate 44 is held in an uppermost open position, can be achieved smoothly and reliably without obstruction by the left injection-unit-reciprocating cylinder 35. Preferably, the left and right injection-unit-reciprocating cylinders 35 and 36 are position in point symmetry with respect to an axis of the nozzle 31. Since the midpoint on a straight line connecting respective axes of the left and right injection-unit-reciprocating cylinders 35, 36 is coincident with the axis of the nozzle 31, the nozzle 31 and the mold sprue (not shown) can be aligned correctly with enhanced accuracy.

When the lifting plate 44 is lifted up to assume the opened position shown in FIG. 4 or the fully-opened position shown in FIG. 5, operation of the injection molding machine 10 does not take place for the sake of safety. When the lifting plate 44 is disposed in a lowermost fully-closed position shown in FIG. 3, this condition constitutes one of permission conditions required for operating the injection molding machine 10.

To this end, a safety switch 57 is provided below the lifting plate 44. The safety switch 57 is fixedly mounted on the fixed platen 24 and hence is not movable. The detection plate 51 provided on the lower end portion of the lifting plate 44 is movable vertically up and down in unison with the lifting plate 44.

Now considering that the pin 55 shown in FIG. 4 moves downward along the guide groove 53. The pin 55 approaches a lower end of the guide groove 53 as the lifting plate 44 is moved downward from the opened position shown in FIG. 3. When the pin 55 arrives at the lower end of the guide groove 53, the lifting plate 44 is disposed in the fully-closed position shown in FIG. 3 where the lifting plate 44 has a vertically suspended posture.

Figure 6:
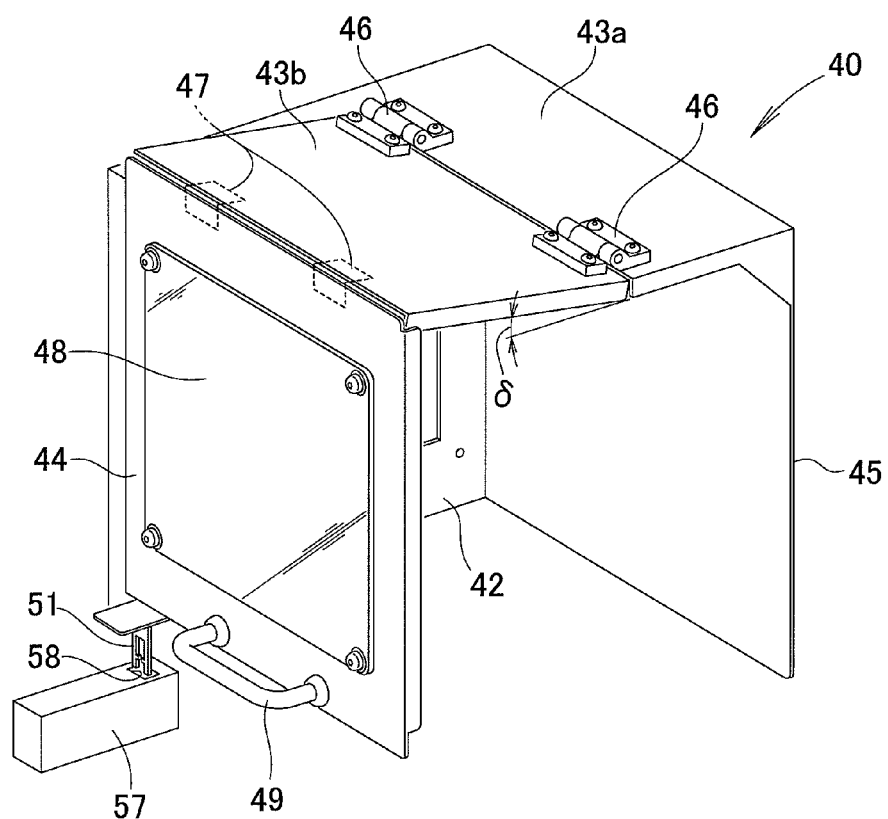
FIG. 6 is a perspective view showing the purge shield and a safety switch associated therewith.

In FIG. 6, the movable plate section 43b of the top plate 43 pivots upward at an angle of δ0 relative to the fixed plate section 43a. When the angle δ is zero (δ=0), the detection plate 51 on the lifting plate 44 moves into a detection hole 58 of the safety switch 57 and activates the safety switch 57. Upon activation, the safety switch 57 detects that the lifting plate 44 has been lowered to a prescribed fully-closed position.

During a time when the angle 6 is reduced to zero, the lifting plate 44 keeps its substantially vertically suspended posture such as shown in FIG. 3.

The detection plate 51 is therefore allowed to move downward toward the detection hole 58 of the safety switch 57 without inclination and can smoothly enter the detection hole 58. If the detection plate 51 undergoes arcuate movement, the detection hole 58 will have to be enlarged. However, such requirement is not applied to the present invention and, hence, the size of the detection hole 58 can be reduced as small as possible. As a result, detection of the lifting plate 44 being in the prescribed fully-closed position can be performed precisely with enhanced reliability.

Although in the illustrated embodiments, two cylinders 35, 36 are provided for reciprocating the injection unit 30, a single cylinder may be employed in place of the two cylinders. In this case, the cylinder is disposed directly below an axis of the nozzle 31.

Obviously, various minor changes and modifications of the present invention are possible in the light of the above teaching. It is therefore to be understood that within the scope of the appended claims the invention may be practiced otherwise than as specifically described.

What is claimed is:
1. An injection molding machine comprising:
a fixed platen to which a mold is fixedly mounted;
an injection unit having a nozzle from which a molten resin is injected into the mold; and
a purge shield mounted to the fixed platen for preventing the molten resin from scattering as the molten resin is purged from the nozzle, wherein the purge shield includes a front plate attached to the fixed platen, a top plate extending horizontally from an upper edge of the front plate toward the injection unit, and left and right side plates extending vertically downward from left and right side edges, respectively, of the top plate, wherein the top plate includes a fixed plate section fixedly connected to the front plate and a movable plate section pivotally connected by a first hinge to the fixed plate section for undergoing pivotal movement in a vertical direction about the first hinge, wherein one of the left side plate and the right side plate is pivotally connected by a second hinge to the movable plate section for undergoing pivotal movement in the vertical direction about the second hinge, the one side plate constituting a lifting plate, wherein the front plate has a vertical guide groove formed therein and a pin slidably fitted in the guide groove, the pin being connected to a lower end portion of the lifting plate, and wherein the first hinge possesses a frictional resistance force set to allow the lifting plate to remain stationary at an arbitrary height.

2. The injection molding machine according to claim 1, wherein the movable plate section has a maximum opened angle more than 90°.

3. The injection molding machine according to claim 2, wherein the movable plate section has a size or a hinged position relative to the fixed plate section determined such that the movable plate section does not protrude beyond an upper end of the fixed platen when the movable plate section pivots upwardly to assume an opened position having an opened angle of 90°.

4. The injection molding machine according to claim 1, wherein the lifting plate has a transparent inspection window.

5. The injection molding machine according to claim 1, wherein the injection unit is connected by left and right cylinders to the fixed platen for undergoing reciprocating movement toward and away from the fixed platen by operation of the cylinders.

6. The injection molding machine according to claim 5, wherein one of the left and right cylinders located closer to the lifting plate than to the other of the left side plate and the right side plate is provided in a position lower than a position of the nozzle, and the other of the left and right cylinders is provided at a position higher than the position of the nozzle.

7. The injection molding machine according to claim 6, wherein the one cylinder and the other cylinder are positioned in point symmetry with respect to an axis of the nozzle.

* * * * *